United States Patent [19]

Kauffman et al.

[11] Patent Number: 4,521,215
[45] Date of Patent: Jun. 4, 1985

[54] POLYVINYL CHLORIDE RESIN PARTICLES DYED WITH CATIONIC DYESTUFFS AND PROCESS OF PREPARATION

[75] Inventors: William J. Kauffman, Penn Township, Lancaster County; Pamela H. Martin, Warwick Township, Lancaster County, both of Pa.

[73] Assignee: Armstrong World Industries, Inc., Lancaster, Pa.

[21] Appl. No.: 489,041

[22] Filed: Apr. 27, 1983

[51] Int. Cl.$^3$ .............................. D06P 1/41; D06P 3/79
[52] U.S. Cl. ........................................ 8/508; 524/114; 524/297
[58] Field of Search .................... 8/508; 524/114, 297

[56] References Cited

U.S. PATENT DOCUMENTS

| | | | |
|---|---|---|---|
| 3,969,071 | 7/1976 | Hugelin | 8/471 |
| 3,995,992 | 12/1976 | Defago et al. | 8/471 |
| 4,232,076 | 11/1980 | Stetson et al. | 428/158 |

OTHER PUBLICATIONS

Colour Index, vol. 2, p. 1608, 1971.
CA 77; 141387h, 1972.

Primary Examiner—Maria Parrish Tungol
Attorney, Agent, or Firm—Laird F. Miller

[57] ABSTRACT

The present invention relates to polyvinyl chloride resin particles which are colored with cationic dyestuffs, to a process of making them, and to plastisols produced therefrom. Resin particles are preferably heated in a solvent medium which preferably is water or comprises water, the solvent medium being suitable to dissolve the cationic dyestuff. The dye penetrates and dyes the particles. Particulate material can be produced having diverse characteristics.

14 Claims, No Drawings

POLYVINYL CHLORIDE RESIN PARTICLES DYED WITH CATIONIC DYESTUFFS AND PROCESS OF PREPARATION

The present invention relates to polyvinyl chloride resins and more particularly to polyvinyl chloride resins which are dyed with cationic dyestuffs.

BACKGROUND OF THE INVENTION

Polyvinyl chloride resins are widely used to produce a variety of products which are found in every day life. While such polyvinyl chloride-containing products may be uncolored, it is usually desirable to impart a color to the product so that they are pleasing to the eye. Various colorants have been used to accomplish this and these basically fall into two categories: dyes (which are soluble in vinyl formulations) and pigments (which are insoluble in vinyl formulations). The latter materials have been the predominantly used colorants for a number of reasons: (a) they generally have good light fastness; (b) for the most part they can withstand the relatively high temperatures to which the vinyl formulations are subjected; (c) and, with certain exceptions, they do not migrate or bleed. On the other hand, the conventionally used dyes for polyvinyl chloride, which primarily are disperse dyes, tend to show all of these detrimental characteristics, and their use has been quite limited.

THE PRIOR ART

Recently, attention has been directed to transfer printing processes whereby a sublimable dye is migrated into a substrate by the application of heat and pressure. The majority of the substrates have been non-vinyl containing materials, such as acrylic or polyester textiles. Nevertheless, transfer printing processes also have been applied to vinyl substrates. One example of such an application is U.S. Pat. No. 4,232,076 which discloses a process whereby a disperse dyestuff may be sublimed into a vinyl substrate to provide, for example, floor coverings; however, such use of disperse dyes has not proved to be entirely satisfactory, primarily because the presence of a plasticizer in the vinyl tends to cause the dye to bleed.

Other transfer printing techniques have used different types of dyes, such as cationic dyes. It has been found that cationic dyes are very difficult to migrate into a vinyl substrate, but that once they have migrated, they tend to remain fixed in place and do not bleed. Certain of these difficulties have been overcome as described in application Ser. No. 376,550; nevertheless, there are disadvantages, as well as advantages, inherent in the use of transfer printing processes.

Accordingly, one objective of the present invention is to provide a process whereby polyvinyl chloride resin particles comprising a cationic dyestuff may be prepared.

Another objective of the present invention is to provide colored resin particles which may be used to prepare plastisols that can be blended together with other plastisols comprising other colored resin particles without causing a significant change in rheology during the blending process.

These and other advantages of the present invention will become apparent from the detailed description of preferred embodiments which follow.

SUMMARY OF THE INVENTION

The present invention relates to polyvinyl chloride resin particles which are colored with cationic dyestuffs, to a process of making them and to plastisols produced therefrom. Resin particles are preferably heated in a solvent medium which preferably is water, or comprises water, the solvent medium being suitable to dissolve the cationic dyestuff. The dye penetrates and dyes the particles. Particulate material can be produced having diverse characteristics.

DETAILED DESCRIPTION OF PREFERRED EMBODIMENTS

In one embodiment the present invention relates to polyvinyl chloride particles comprising a cationic dyestuff.

In a second embodiment, the present invention relates to a process for providing polyvinyl chloride particles comprising a cationic dyestuff, said process comprising the steps of preparing a liquid medium comprising a cationic dyestuff, said dyestuff being substantially soluble in said liquid medium; dispersing polyvinyl chloride particles in said liquid medium, said particles being substantially insoluble in said liquid medium; maintaining contact between said particles and said medium until a desired color is attained; and separating said particles from said medium.

In a third embodiment, the present invention relates to a plastisol composition, said composition comprising (a) polyvinyl chloride particles comprising at least one cationic dyestuff, and (b) a suitable plasticizer, said composition having a selected viscosity and a selected color.

A variety of polyvinyl chloride particles may be utilized when practicing the present invention. The particle sizes of these materials are immaterial and range from very small particles to PVC chips. This description includes dispersion or plastisol-type resins, as well as nondispersion-type resins, including general purpose resins and solution-type resins. The plastisol-type resins are usually of very small particle size, typically on the order of 0.1 to 3 microns. These resins usually have very poor plasticizer-absorbing capabilities and they are used to prepare plastisols, which are dispersions of plastisol-type resins in plasticizers. However, modified or converted versions of these resins have also been produced in which the resins have remarkably improved plasticizer absorption capabilities. Detailed information relating to these resins and the conversion process is set forth in copending application Ser. No. 489,040, the contents of which are herein incorporated by reference, but it must be noted that both the present invention and the conversion process may be practiced simultaneously if appropriate conditions are selected.

General purpose resins are of larger particle size, generally on the order of about 25 to about 220 microns. These resins have high plasticizer-absorbing capabilities in relation to the plastisol-type resins. They are commonly used as dry blending resins, but they also serve as plastisol additives which adjust viscosity, lower cost, alter gel rates, and the like.

In addition to these two broad classes of resins, very large polyvinyl chloride particles, such as those having a particle size of 0.25 to 0.75 mm in diameter, are also used. These particles often serve as accent chips in vinyl structures, such as flooring structures.

The resins usable with the present invention may be homopolymer or copolymer resins, and they may be prepared by any appropriate manufacturing process; e.g., solution polymerization, emulsion polymerization, suspension polymerization, mass polymerization and micro-suspension polymerization.

The foregoing review of generally used polyvinyl chloride particles is in no way intended to limit the scope of the present invention. It is merely intended to illustrate the broad spectrum of particle sizes and types which are available. Thus, all manner of polyvinyl chloride particles should be considered as being suitable to practice the present invention, regardless of their method of manufacture, regardless of whether they fall within the above specifically described particle size ranges, and regardless of whether they are homopolymer or copolymer resins.

The liquid medium which is used to practice the present invention will comprise components in which the cationic dyestuffs are substantially soluble, but in which the resin particles are substantially insoluble. Preferably, the liquid medium will comprise water because the vast majority of cationic dyestuffs are soluble in water, whereas the polyvinyl chloride resins are not. Furthermore, the use of water minimizes or eliminates toxicity and environmental health hazard considerations, and water has other advantages which are referred to in more detail below.

Virtually any cationic dyestuff may be used to practice the present invention, provided that it can be substantially dissolved in the liquid medium. Hundreds of these dyes are in existence, and many are found in *The Colour Index* published by the Society of Dyers and Colourists in association with the American Association of Textile Chemists and Colorists.

When practicing the present invention, it is usually convenient to dissolve the cationic dyestuff in the liquid medium and then to disperse the PVC particles therein; however, the order of addition has little significance. The concentration of the dyestuff, in virtually all instances, will depend upon the color which is desired by the artisan. Thus, the concentration of dye would be increased in proportion to the desired color intensity.

The temperature at which the resin is added to the dye solution is also of little consequence; however, temperature does play an important part in determining dye intensity and dye fastness, as does the selection of the solvent medium. For example, if a resin sample is stirred with an appropriate dye in water at room temperature, and then is filtered and dried, a dyed sample is obtained in which the dye is not firmly adhered. This can be demonstrated by washing the dye particles with alcohol, which causes a substantial portion of the dye to be removed. However, as the temperature of the water is increased, the tendency of the dye to become more firmly associated with the resin particles is increased. Thus, as a general rule, the higher the temperature at which dyeing is accomplished, the more difficult it is to remove the dye from the particles by extraction. It is usually advantageous to have the dye firmly adhered to the resin particles; nevertheless, particles in which the dye is not firmly adhered also have utility. The liquid medium may also have an effect on the dying process as suggested above. For example, if ethanol is used in place of water, or in combination with water, the dye color is often less intense.

As an added advantage, the present invention may be carried out in the presence of extraneous components without adverse effect, and, in particular, it is not necessary that the resins be free of plasticizers when dyeing occurs. For example, fluffed dry blending resins or the plasticized resins described in application Ser. No. 489,040 may be satisfactorily dyed according to the present invention even though they were previously treated with plasticizer.

The dyed particles of the present invention have a wide range of utility whether used in a wet or dry state, and they may be used to prepare decorative and protective films and structures having high transparency and through color. In particular, they are highly useful to prepare flooring structures. The manner of use may depend on the particle size, but a major advantage can be found when these materials are used in plastisol dispersions. This advantage relates to viscosity control, which can be a problem when using pigments. For example, to change color in a pigment system, more pigment must be added to the plastisol dispersion in order to change the color. This causes the rheology of the system to change and also decreases the transparency of the resulting product. However, with the present invention, the color change can be effected by adding a plastisol having the same viscosity, but a different (or more intense) color, to the plastisol system. This results in a change in color but not a change in rheology, which is a significant attribute in situations where time is an important consideration. As another alternative, the proper color may be obtained by dry mixing various colored particles and then preparing a plastisol having an appropriate viscosity. In either event, the resulting product will have through-color transparency, an attribute which usually is not obtainable with pigment systems.

The advantages and attributes of the present invention will become more apparent by reference to the following examples which are presented by way of illustration and not limitation.

EXAMPLES

EXAMPLE 1

This example will illustrate the dyeing in water of certain types of polyvinyl chloride resins designated as general purpose resins (GP), blending grade resins (B), dispersion grade resins (D), and polyvinyl chloride chips (C). The general purpose, blending and dispersion resin samples were commercially available whereas the the chip sample was prepared by mixing 100 parts by weight of the indicated resin, 30 parts by weight dioctyl phthalate plasticizer and 2 parts by weight tin maleate stabilizer using a Banbury mixer. The mixed material was then calendered to a 10-mil thick vinyl sheet which was diced and ground to produce the small chips.

The same general procedure was practiced for each sample. The dye was dissolved in the water, heated to the indicated temperature and the resin sample was then added and stirred at the indicated temperature for either 15 or 30 minutes. The resin samples were then separated from the dye solution, washed with 1500–1800 ml of hot tap water and dried at ambient conditions for 24 hours. The conditions were as follows:

| Sample No | Resin Source | Resin | Weight (g) | Type | Dye | Dye Weight (g) | Water Volume (ml) | Time (min) | Temperature (°F.) |
| --- | --- | --- | --- | --- | --- | --- | --- | --- | --- |
| 1A | Goodrich | Geon 92 | 125 | GP | Basic Yellow 13 | 0.1 | 1,000 | 15 | 180 |
| 1B | Borden | 260 SS | 200 | B | Basic Blue 26 | 0.5 | 1,200 | 30 | 180 |
| 1C | Tenneco | 0565 | 200 | D | Basic Blue 26 | 0.5 | 1,200 | 30 | 120 |
| 1D | Tenneco | 0565 | 200 | D | Basic Yellow 13 | 0.5 | 1,200 | 30 | 120 |
| 1E | Tenneco | 0565 | 200 | D | Basic Red 46 | 0.5 | 1,200 | 30 | 120 |
| 1F | Occidental | B-282 | 100 | C | Basic Yellow 13 | 0.15 | 1,000 | 15 | 180 |

EXAMPLE 2

This example will illustrate variations in dye color (shade) and dye permanence as a function of temperature and solvent. Using Tenneco 0565 resin, the dyeing procedure was practiced at various temperatures, as indicated, using essentially the process set forth in Example 1. The volume of solvent was 1,200 ml, the quantity of Basic Blue 26 dye was 0.5 gram and the time of heating at the indicated temperature was 30 minutes. After the dyeing process was complete, the resin samples were filtered using a Buchner funnel and rinsed with hot tap water as described in Example 1. The resin samples were then spread on paper and dried at ambient temperature for 24 hours. To ascertain dye fastness, one gram of each resin sample was extracted with 40 ml of ethanol at room temperature for one hour with occasional stirring. In certain instances, 5-gram samples of the water-dyed resins were extracted for 24 hours with 900 ml of water. The extracted samples were also filtered and allowed to dry at ambient temperature for evaluation. The temperatures indicated in the table are those at which the samples were dyed in the indicated medium.

| Dyeing Medium | Color of Sample After Indicated Treatment | | | |
| --- | --- | --- | --- | --- |
| | 78° F. | 100° F. | 120° F. | 150° F. |
| I. Water | | | | |
| (a) after dyeing | Dark Blue | Dark Blue | Dark Blue | Dark Blue |
| (b) after ethanol extraction | Light Pale Blue | Light Pale Blue | Light Pale Blue | Medium Blue |
| (c) after water extraction | NM | Dark Blue | NM | Dark Blue |
| II. Water/Ethanol (1:1) | | | | |
| (a) after dyeing | NM | NM | Medium Blue | Medium Dark Blue |
| (b) after ethanol extraction | NM | NM | Light Pale Blue | Medium Dark Blue |
| III. Ethanol | | | | |
| (a) after dyeing | NM | NM | Light Pale Blue | Medium Blue |
| (b) after ethanol extraction | NM | NM | Light Pale Blue | Medium Blue |

NM = not measured

These data indicate that more intense colors can be obtained in aqueous media and that the color of the resin is more stable to water extraction than it is to ethanol extraction. Furthermore, as the temperature of treatment increases, the permanence of the color increases.

EXAMPLE 3

This example will illustrate that the dyeing characteristics of dispersion type resins which have been converted as described in Application Ser. No. 489,040 are essentially the sames as those of unconverted resins. A 200-gram sample of Occidental 6338 copolymer vinyl chloride dispersion resin was added to 1,000 ml of deionized water and the mixture was heated at 180° F. for 30 minutes. The resin was then filtered using a Buchner funnel, spread on kraft paper and allowed to dry at ambient temperature for 24 hours. This treatment produced a high-plasticizer-absorbing, converted resin which is referred to herein as Sample 3A. The 200-gram quantity of sample 3A and 200 grams of untreated Occidental 6338 resin (referred to as Sample 3B) were individually dyed in water at 120° F., and color permanence was established by ethanol extraction as described in Example 2. The results are tabulated below.

| | Color of Sample After Indicated Treatment | |
| --- | --- | --- |
| | Sample 3A | Sample 3B |
| After dyeing | Dark Blue | Dark Blue |
| After ethanol extraction | Light Pale Blue | Light Pale Blue |

No significant difference in dyability and permanence of color was observed between Sample 3A and 3B, illustrating that the resin is dyed in essentially the same manner regardless of whether it is converted or unconverted.

EXAMPLE 4

This example will illustrate the preparation of plastisols using blending resins which were dyed with cationic dyes as described for Example 1B. A plastisol was prepared in a conventional manner using the following components:

| Component | Parts By Weight |
| --- | --- |
| Tenneco 1732 dispersion resin | 80 |
| Borden 260 SS blending resin dyed with Basic Blue 26 dye | 20 |
| Dioctyl phthalate plasticizer | 28 |
| Epoxidized soybean oil | 5 |
| Tin maleate stabilizer | 1 |

The resultant plastisol had a Brookfield viscosity of 5860 cps, measured using a #5 spindle at 20 rpm.

A similar plastisol was also prepared using the same components and proportions, except that 10 parts of the blue-dyed resin was replaced with 10 parts of the same resin that had been dyed with Basic Yellow 13 dye. The Brookfield viscosity of this sample, measured in the same manner, was 6,000 cps, which illustrates that various resins may be substituted for one another without causing a substantial change in viscosity.

To illustrate the utility of these plastisols, 8-mil layers of plastisol were applied to release paper and fused at 375° F. for 2.5 minutes. The resulting colored 8-mil films had high transparency.

EXAMPLE 5

This example will illustrate the preparation of plastisols comprising the dispersion resins illustrated in Example 1 C, D, and E. Each plastisol comprised the following components:

| Component | Parts By Weight |
| --- | --- |
| Dyed Tenneco 0565 dispersion resin | 100 |
| Dioctyl phthalate plasticizer | 55 |
| Epoxidized soybean oil | 5 |
| Tin maleate | 1 |

Plastisols were also prepared using untreated Tenneco 0565 resin, and a resin sample which had been slurried in water and then isolated as described in Example 1. The following Brookfield viscosities were measured using a #5 spindle at 20 rpm.

| Resin Type | Viscosity |
| --- | --- |
| Dyed with Basic Red 46 | 4,500 |
| Dyed with Basic Yellow 13 | 3,500 |
| Dyes with Basic Blue 26 | 4,500 |
| Water washed resin | 4,000 |
| Control resin | 6,250 |

These data indicate that there is little difference in plastisol viscosity between the various dyed samples but surprisingly, there does appear to be a decrease in viscosity for the dyed and washed samples as compared to the untreated resin sample.

Each of the dyed samples was formed into an 8-mil film as described in Example 4 and fused to give bright, uniformly colored films with high transparency.

EXAMPLE 6

This example will illustrate the viscosity differences observed between pigmented plastisols and plastisols prepared as described using dyed particles of the present invention. A large quantity of control plastisol was made with Tenneco 0565 dispersion resin as described in Example 5 and the plastisol was divided into three equal portions. To one portion of the plastisol was added phthalocyanine blue pigment at a level of 2 parts pigment for each 100 parts of resin. To a second portion of the plastisol was added the same phthalocyanine blue pigment at a level of 4 parts for each 100 parts of resin. The third portion was retained as a control. In addition, a plastisol was also prepared as described in Example 5 using 100 parts of resin which had been dyed with Basic Blue 26 dye as described in Example 1C. Brookfield viscosities were measured for each of the plastisols using a #5 spindle at 20 rpm.

| Plastisol | Viscosity (cps) |
| --- | --- |
| Dyed resin | 9,250 |
| Control plastisol | 14,750 |
| Control plus 2 parts pigment | 18,000 |
| Control plus 4 parts pigment | 25,500 |

This example illustrates that a dramatic increase in viscosity occurs through the addition of pigment to color the plastisol.

Each of the colored plstisols was coated on a release paper at a thickness of eight mils and fused at 375° F. for 2.5 minutes. Although each of the resulting films showed an intense blue color, the film comprising the Basic Blue 26 dye had obviously superior optical clarity.

EXAMPLE 7

This example, will illustrate that the presence of a plasticizer has essentially no adverse effect on the dying of PVC particles. A quantity of Geon 92 general purpose resin from Goodrich was compounded at a level of 30 parts by weight of dioctyl phthalate for each 100 parts of resin using standard Henschel dry blending techniques. The particles were then dyed with Basic Blue 26 dye using the conditions described in Example 1 for Sample No. 1B. Dark blue resin particles were obtained. Although the glass transition temperature of these particles was lower than that of the untreated resin particles due to the presence of the plasticizer, dye fastness was unaffected.

The present invention is not restricted solely to the descriptions and illustrations provided above, but encompasses all modifications envisaged by the following claims.

What is claimed is:

1. Polyvinyl chloride particles comprising a cationic dyestuff, said particles being obtained from the contacting of a particulate polyvinyl chloride material with a composition consisting essentially of a liquid medium and a cationic dyestuff, said dyestuff being substantially soluble in said liquid medium and said particles being substantially insoluble in said liquid medium.

2. The invention as set forth in claim 1 hereof wherein said dyestuff is heat-fixed so as to be essentially non-extractable.

3. The invention as set forth in claim 1 hereof wherein said liquid medium comprised water.

4. The invention as set forth in claim 1 hereof wherein said liquid medium comprised an organic solvent.

5. The invention as set forth in claim 1 hereof wherein said particles comprise a plasticizer.

6. A process for providing polyvinyl chloride particles comprising a cationic dyestuff, said process comprising the steps of
   (a) preparing a composition consisting essentially of a liquid medium and a cationic dyestuff, said dyestuff being substantially soluble in said liquid medium;
   (b) dispersing polyvinyl chloride particles in said composition, said particles being substantially insoluble in said liquid medium;
   (c) maintaining contact between said particles and said composition until a desired color is obtained; and
   (d) separating said particles from said composition.

7. The invention as set forth in claim 6 hereof wherein said composition is heated.

8. The invention as set forth in claim 7 hereof wherein said heating is sufficient to fix said dyestuff so that it is essentially non-extractable.

9. The invention as set forth in claim 6 hereof wherein said liquid medium comprises water.

10. The invention as set forth in claim 6 hereof wherein said liquid medium comprises an organic solvent.

11. A plastisol composition, said composition comprising
    (a) polyvinyl chloride particles comprising at least one cationic dyestuff, said particles being obtained from the contacting of particulate polvyinyl chloride material with a composition consisting essentially of a liquid medium and a cationic dyestuff, said dyestuff being substantially soluble in said liquid medium and said particles being substantially insoluble in said liquid medium, and (b) a suitable plasticizer, said plastisol composition having a selected viscosity and a selected color.

12. The invention as set forth in claim 11 hereof, said color being obtained from the preselection and mixing of dyed resin particles with said plasticizer.

13. The invention as set forth in claim 11 hereof, said color being obtained from the blending of a first plastisol with a second comparable plastisol, said first plastisol comprising at least one cationic dyestuff and said second plastisol optionally comprising one or more cationic dyestuffs, each said plastisol having essentially identical viscosities.

14. The invention as set forth in claim 11 hereof wherein the particles comprise dye which is heat-fixed so as to be essentially non-extractable.

* * * * *

Disclaimer 4,521,215.—*William J. Kaufman*, Penn Township, Lancaster County; *Pamela H. Martin*, Warwick Township, Lancaster, both of Pa. POLYVINYL CHLORIDE RESIN PARTICLES DYED WITH CATIONIC DYESTUFFS AND PROCESS OF PREPARATION. Patent dated June 4, 1985. Disclaimer filed Apr. 21, 1986, by the assignee, *Armstrong World Industries, Inc.*

Hereby enters this disclaimer to claims 1-3 and 6-9 of said patent.
[*Official Gazette July 1, 1986.*]